US008265636B2

(12) United States Patent
Lee et al.

(10) Patent No.: US 8,265,636 B2
(45) Date of Patent: Sep. 11, 2012

(54) METHOD AND APPARATUS FOR MANAGING CELLS OF MULTI-MODE PORTABLE TERMINAL

(75) Inventors: Hyun Hye Lee, Suwon-si (KR); Sang Hyun Lee, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 1116 days.

(21) Appl. No.: 12/127,875

(22) Filed: May 28, 2008

(65) Prior Publication Data
US 2008/0299982 A1    Dec. 4, 2008

(30) Foreign Application Priority Data

May 31, 2007   (KR) .................. 10-2007-0053036

(51) Int. Cl.
*G06F 15/18* (2006.01)
(52) U.S. Cl. ..................................... 455/446; 455/456.1
(58) Field of Classification Search .............. 455/445, 455/446, 448, 456.1, 552.1
See application file for complete search history.

(56) References Cited

U.S. PATENT DOCUMENTS

| 4,402,082 A   | * | 8/1983 | Cope .......................... 714/712 |
| 2009/0054070 A1 | * | 2/2009 | Gallagher et al. ........... 455/445 |

FOREIGN PATENT DOCUMENTS

| KR | 2005-72443   | 7/2005  |
| KR | 2006-132988  | 12/2006 |
| KR | 2007-32534   | 3/2007  |
| KR | 2007-32535   | 3/2007  |

* cited by examiner

*Primary Examiner* — Sam Bhattacharya
(74) *Attorney, Agent, or Firm* — Cha & Reiter, LLC (57) ABSTRACT

An apparatus and method are disclosed, which adjusts the number of neighbor cells managed by a multi-mode portable terminal according to the system environment. The method includes measuring the network environment periodically and adaptively changing the number of neighbor cells of a licensed wireless system according to the measured network environment.

21 Claims, 4 Drawing Sheets

METHOD AND APPARATUS FOR MANAGING CELLS OF MULTI-MODE PORTABLE TERMINAL

CLAIM OF PRIORITY

This application claims the benefit of the earlier filing date, pursuant to 35 USC 119(a), to that patent application entitled "METHOD AND APPARATUS FOR MANAGING CELLS OF MULTI-MODE PORTABLE TERMINAL," filed in the Korean Intellectual Property Office on May 31, 2007 and assigned Serial No. 2007-0053036, the contents of which are incorporated herein by reference.

BACKGROUND OF THE INVENTION

1. Field of the Invention

The present invention relates to a portable terminal, and more particularly to an apparatus and method that can adaptively control the number of neighbor cells managed by a multi-mode portable terminal according to a system environment.

2. Description of the Related Art

In general, licensed wireless systems (or mobile communication systems such as a GSM, UMTS, and CDMA) and unlicensed wireless systems (or WLAN such as Wi-Fi, Bluetooth) have been constructed through respective networks that are in the same area. Due to relatively high speed and low service costs, unlicensed wireless systems have spread rapidly. However, unlicensed wireless systems have the disadvantages of servicing a limited area and low mobility. On the other hand, licensed wireless systems have the disadvantages of low service speed and high service costs, but the advantages of servicing a wide area and high mobility.

Recently, an unlicensed mobile access (UMA) technology, as convergence technology, has been developed to combine a licensed wireless system with an unlicensed wireless system so that they can associate with each other. Also, a multi-mode mobile station has been developed to access both a licensed wireless system and an unlicensed wireless system.

UMA technology refers to technology where a UMA network controller (UNC) provides a voice service, data service, and added services, which have been provided by the conventional mobile communication system, through an access point (AP) of an unlicensed wireless system, i.e., a wireless local area network (WLAN) AP, without changing the MSC, SGSN, GGSN, and HLR, etc. in the conventional mobile communication system.

A portable terminal supporting the UMA technology allows a user to continue to use the service, using the licensed wireless system and the unlicensed wireless system, even while entering an indoor environment where WLAN signal strength is strong. That is, the UMA technology enhances the quality of the portable terminal and allows mobile communication service providers to reduce the complexity of the system.

The portable terminal manages the cells for the licensed wireless system in such a communication environment where a mix of licensed wireless system and an unlicensed wireless system exists. The licensed wireless system is composed of a group of a certain number of neighbor cells. The portable terminal manages a part of neighbor cells whose received signal strengths are relatively strong. In this case, the portable terminal performs processes not necessary to the management of the neighbor cells and accordingly consumes electric power, although the portable terminal does not have any problem in providing communication services, such as a communication error and a service interruption, etc. Therefore, an alternative is required to efficiently manage the cells of a portable terminal in a communication environment where a mix of unlicensed wireless and licensed wireless systems exist.

SUMMARY OF THE INVENTION

The present invention provides an apparatus and method that can efficiently manage cells of a multi-mode portable terminal in an unlicensed mobile access (UMA) communication system where a licensed wireless system and an unlicensed wireless system exist.

The present invention further provides an apparatus and method that can efficiently manage cells of a multi-mode portable terminal according to a system environment.

The present invention further provides an apparatus and method that can adaptively change and manage the number of neighbor cells managed by a multi-mode portable terminal according to the received signal strength indicator of an unlicensed wireless system and the received signal strength indicator of a licensed wireless system.

In accordance with an embodiment of the present invention, a method for managing cells of a multi-mode portable terminal includes: determining whether a received signal strength indicator corresponds to an unlicensed wireless system or a licensed wireless system; and changing the number of neighbor cells managed by the multi-mode portable terminal in response to the determination.

In accordance with another embodiment of the present invention, a method for managing cells of a multi-mode portable terminal includes: measuring a network environment periodically; and adaptively changing and managing the number of cells near a licensed wireless system, which are managed by the portable terminal, in response to the measured network environment.

In accordance with another embodiment of the present invention, a method for managing cells of a multi-mode portable terminal includes: measuring a network environment in an unlicensed wireless system supporting mode; adaptively adjusting a certain number of neighbor cells managed by the portable terminal, which are from among the neighbor cells of the unlicensed wireless system, to the network environment; and re-measuring a received signal strength indicator of the unlicensed wireless system when the number of neighbor cells is changed.

In accordance with another embodiment of the present invention, a multi-mode portable terminal includes a $1^{st}$ communication module for communicating with a licensed wireless system, a $2^{nd}$ communication module for communicating with an unlicensed wireless system and a common module for measuring a network environment based on signals received through the $1^{st}$ and $2^{nd}$ communication modules and controlling the number of managed neighbor cells to comply with the measured network environment correspondingly.

BRIEF DESCRIPTION OF THE DRAWINGS

The above features, and advantages of the present invention will be more apparent from the following detailed description in conjunction with the accompanying drawings, in which.

DETAILED DESCRIPTION OF THE INVENTION

Now, embodiments of the present invention are described in detail with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

The terms or words described in the present description and the claims should not be limited by a general or lexical meaning, but instead should be analyzed as a meaning and a concept through which the inventor defines and describes the present invention with his best effort, to comply with the idea of the present invention. Therefore, one skilled in the art will understand that the embodiments disclosed in the description and configurations illustrated in the drawings are only illustrative embodiments, and there may be various modifications, alterations, and equivalents thereof to replace the embodiments at the time of filing this application.

The present invention proposes a multi-mode portable terminal. In particular, the present invention provides an apparatus and method that can efficiently manage cells of the multi-mode portable terminal in a communication system including a licensed wireless infrastructure and an unlicensed wireless infrastructure.

If a portable terminal operates in a detached cell reselection mode in an unlicensed mobile access (UMA)/generic access network (GAN), it can adaptively control the number of its neighbor cells according to the received signal strength indicator obtained from the neighbor cells, and can manage the neighbor cells. Therefore, when the portable terminal changes from an unlicensed wireless system to a licensed wireless system, it can continue to provide the current service without interruption, reducing its processing load and battery power consumption. That is, when the portable terminal changes from a UMA/GAN mode to a GSM edge radio access network (GERAN)/UMTS terrestrial radio access network (UTRAN) mode, it can reduce the processing load and battery power consumption to manage cells, without service interruption.

Figure 1:
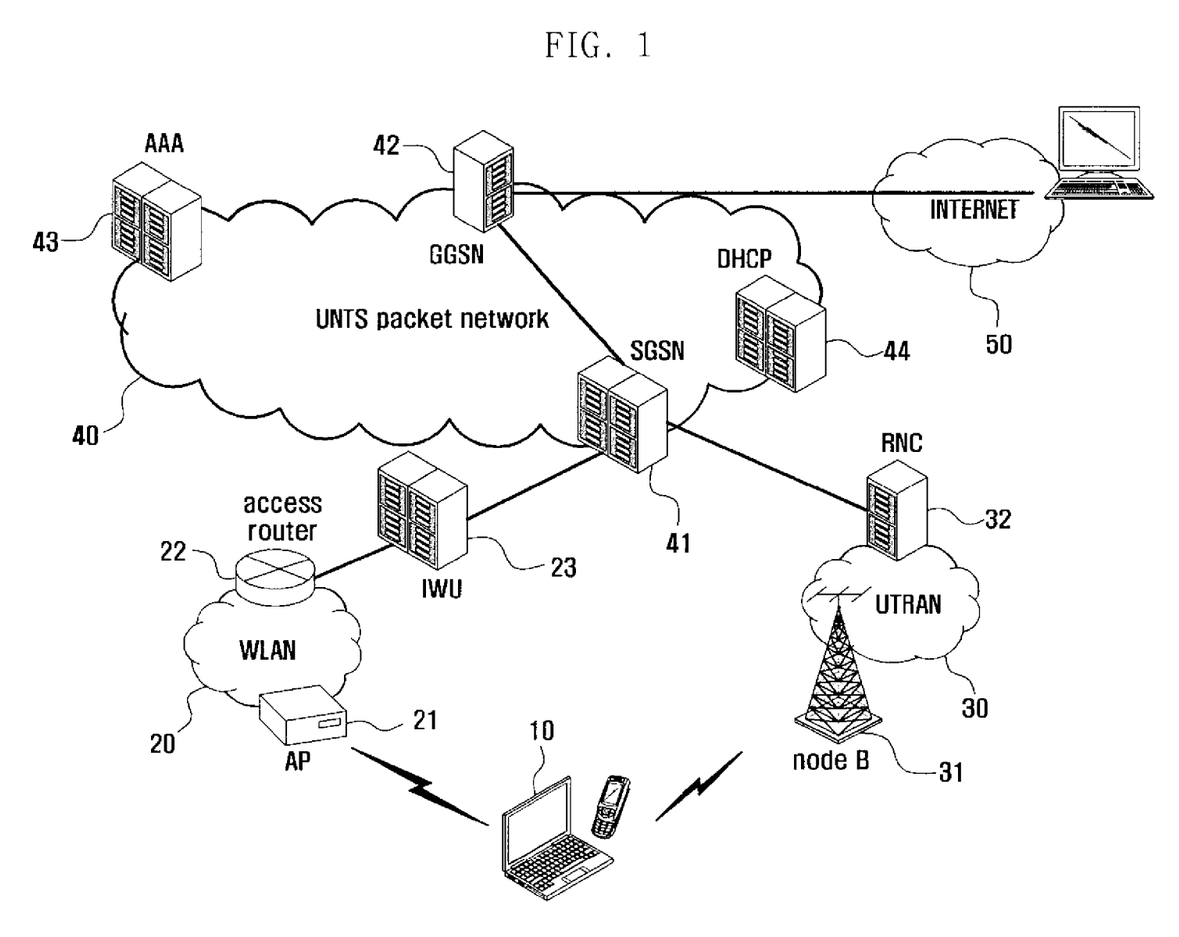
FIG. 1 is a schematic view depicting a structure of a wireless communication system according to an embodiment of the present invention.

FIG. 1 is a schematic view depicting a structure of a wireless communication system according to an embodiment of the present invention, in which an unlicensed wireless system is implemented with a WLAN and a licensed wireless system is implemented with a UMTS. That is, FIG. 1 is a structure of a system for associating a WLAN network with a UMTS network, which is called a WLAN-UMTS inter-network cooperation. Although an embodiment of the present invention is described based on the WLAN-UMTS inter-network cooperation, it should be recognized that the present invention is not to be restricted thereto. But, instead the present invention can be applied to a variety of licensed wireless systems and a variety of unlicensed wireless systems, which will be described later.

Referring to FIG. 1, a multi-mode portable terminal 10, which can provide packet services through the WLAN and the UMTS, receives services through the WLAN 20 or the UTRAN 30 depending on its position.

If the multi-mode portable terminal 10 is located in an area to receive a WLAN service, it is wirelessly matched with the WLAN 20 through an access point (AP) 21. The WLAN 20 transmits a message requested by a corresponding portable terminal 10 to a UMTS packet network 40 through an access router (AR) 22.

Here, an inter-work unit (IWU) 23 is located between the WLAN 20 and the UMTS packet network 40 to match the WLAN 20 with the UMTS packet network 40.

On the contrary, if the multi-mode portable terminal 10 is located in an area not to receive a WLAN service, it is matched with the UTRAN 30 through a node-B (Node-B) 31. The UTRAN 30 transmits a service message requested by the multi-mode portable terminal 10 to the UMTS packet network 40 through a radio network controller (RNC) 32.

The UMTS packet network 40 processes an authorization and a request to set-up a packet call of the multi-mode portable terminal 10, which requests a packet service through the WLAN 20 or the UTRAN 30, using a serving GPRS support node (SCSN) 41, and requests internet protocol (IP) address allocation/authorization to a gateway GPRS support node (GGSN) 42 to allocate an IP address to the multi-mode portable terminal 10.

The GGSN 42 identifies the portable terminal using international mobile subscriber identity (IMSI) number transmitted from the SGSN 41. The GGSN 42 allocates IP addresses and then stores an IP address allocated to a corresponding IMSI number. When an IP address is allocated to the multi-mode portable terminal 10, a service subscriber can use a packet service.

A packet call is set up in the UTRAN area according to a packet session set-up procedure, recommended by the 3GPP.

The SGSN 41 in the WLAN-UMTS inter-network serves as a matching node for providing a WLAN-UMTS packet service. The SGSN 41 employs the wireless matching standard and performs a call processing and a node matching according to a UMTS packet service procedure, which is called a WLAN-UMTS tight coupling structure.

In order to convert protocols between the WLAN and the UMTS and to be matched with the SGSN, the above-described system must develop an Inter Working Unit (IWU) function and define a matching protocol between the IWU and the SGSN. This makes the network configuration relatively complicated and requires high costs to develop new nodes and protocol conversion.

To resolve these problems, the system has been developed in such a way that the IWU node having served to associate the WLAN packet network with the UMTS packet network is omitted, and the GGSN, instead of SGSN used as a matching node, is employed to provide the WLAN-UMTS packet service. As such, when a matching is established by the GGSN that manages/allocates IPs, such a matching structure is called a "WLAN-UMTS inter-network cooperation" or an "IP coupling structure" in an IP layer.

The multi-mode portable terminal according to an embodiment of the present invention may set up a communication mode according to a user interface, for example, a menu "Mode Selection Preference" as described in following Table 1.

TABLE 1

Mode Selection Preference

● UMA/GAN preferred
○ GERAN/UTRAN preferred

A user of the multi-mode portable terminal can set up a communication mode according to a user interface, "Mode Selection Preference," as described in Table 1.

In Table 1, the user interface item "UMA/GAN preferred" serves to set up priority such that the multi-mode portable terminal can be connected to an unlicensed wireless system of the wireless systems, such as a WLAN. Also, the user interface item "GERAN/UTRAN preferred" serves to set up priority such that the multi-mode portable terminal can be connected to a licensed wireless system of the wireless systems, GERAN/UTRAN.

In addition, another user interface item, such as a "Dual Mode," may be further shown in Table 1 to allow the multi-mode portable terminal to operate in all supportable wireless systems, simultaneously.

When the portable terminal is in the UMA/GAN mode, it can operate in both the hibernation mode and the detached cell reselection mode, simultaneously.

When the portable terminal, in the hibernation mode, enters the UMA/GAN mode, it turns off a corresponding communication module to communicate with a licensed wireless system. In this case, the portable terminal stores information about a serving cell. When the portable terminal releases itself from the hibernation mode, it requests a service to the GERN/UTRAN using the stored corresponding information about the serving cell.

When the portable terminal, in the detached cell reselection mode, enters the UMA/GAN mode, it manages a radio resource (RR) using a procedure recommended by the 3GPP, without turning off a corresponding communication module to communicate with a licensed wireless system.

Also, when the portable terminal in a UMA/GAN mode is operated in the detached cell reselection mode, it manages a number of neighbor cells of the multi-mode portable terminal, whose received signal strength indicators (RXLEV) are relatively strong. The number of neighbor cells is determined depending on the system situation or system design. For example, the embodiment of the present invention is implemented in such a way that the neighbor cells of the multi-mode portable terminal are 32 and, of 32 neighbor cells, the portable terminal manages 6 neighbor cells whose received signal strength indicators (RXLEV) are relatively strong.

In this case, the multi-mode portable terminal measures the received signal strength indicators (RXLEV) of 32 neighbor cells periodically and, of them, decodes base station identity code (BSIC) values of 6 neighbor cells whose received signal strength indicators (RXLEV) are relatively strong. The BSIC refers to an inherent code to identify a base station, that is included in a message transmitted through the transmission channels of a cell or a base station.

Also, every time the BSIC values of the 6 neighbor cells, whose received signal strength indicators RXLEV are relatively strong, are changed, the multi-mode portable terminal must decode the broadcast control channel (BCCH) data of a corresponding neighbor cell. The BCCH refers to a logical channel that is used to transmit identification and configuration information of a common control channel and a cell service in a communication system.

Although there may be no problem with the quality of the service that the portable terminal is currently providing, the portable terminal still performs such unnecessary processing, thereby wasting power. However, if the portable terminal does not consider the system environment and does not manage any neighbor cell, the portable terminal may stop providing the service when the UMA/GAN mode is moved into the GERAN/UTRAN mode.

In an embodiment of the present invention, the network cells of the licensed wireless system, such as GERAN/UTRAN, managed by the portable terminal, can be adaptively changed and managed according to the received signal strengths of the licensed wireless system and the unlicensed wireless system. When the portable terminal in the UMA/GAN mode is moved to the network of the licensed wireless system (GERAN/UTRAN mode), it can prevent the service from being interrupted and can reduce processing load and battery power consumption.

The following is a description of a method for managing cells in the communication system described above.

In the case that the portable terminal in a UMA/GAN mode operates in a detached cell reselection mode, the present application discloses a method that manages cells according to the WLAN received signal strength indicator (WLAN_RSSI), which is managed by a UMA/GAN radio resource management entity (for example, UMA/GAN-RR Entity), and the GERN received signal strength indicator (RXLEV) that is managed by a GERN/UTRAN radio resource management entity (for example, GERN-RR Entity). The UMA/GAN and GERN/UTRAN radio resource management entities are included in software modules of the multi-mode portable terminal.

The licensed wireless system according to the present invention includes: a variety of communication systems, such as a global system for mobile communication (GSM) system, general packer radio service (GPRS) system, UMTS system, international mobile telecommunication 2000 (IMT-2000) system, code division multiple access (CDMA) system, and wideband code division multiple access (WCDMA) system, and a combination thereof. Therefore, the licensed wireless system in the following may include the networks defined in each communication system, such as a GERAN and a UTRAN, etc.

In addition, the unlicensed wireless system according to the present invention includes: a WLAN, such as a Wi-Fi, etc.; and wireless systems supporting UMA/GAN technology that can use frequency bands, not permitted, for Bluetooth, RFID, ultra wideband (UWB), and Zigbee, etc. Therefore, the unlicensed wireless system in the following may include the networks defined in each communication system, such as a UMAN and a GAN, etc.

Although the method for managing neighbor cells of a multi-mode portable terminal, according to the present invention, will be described based on the networks for a licensed wireless system (for example, a GERAN) and a unlicensed wireless system (for example, a WLAN), it should be understood that the present invention is not restricted to the embodiments. Instead, it should be understood that the method of the present invention will be applied to the communication systems described above, a combination thereof, and all communication systems intended to be developed in the future. Here, since the respective communication systems, described above, are well known, their detailed descriptions will be skipped in the following.

Also, the portable terminal according to the present invention includes: all communication terminals supporting UMA/GAN technology that are operated based on a communication protocol that can be applied to terminals, such as an IMT-2000 terminal, GSM terminal, GPRS terminal, EDGE terminal, UMTS terminal, CDMA terminal, and WDMA terminal, etc.; and all the information communication devices, multimedia devices, and their applications, such as, a portable multimedia player (PMP), MP3 player, digital broadcast receiver, personal digital assistant (PDA), smart phone, mobile phone, and laptop computer, etc., which can be communicated with a station of a mobile communication network, such as the above listed communication systems, and through a WLAN.

Figure 2:
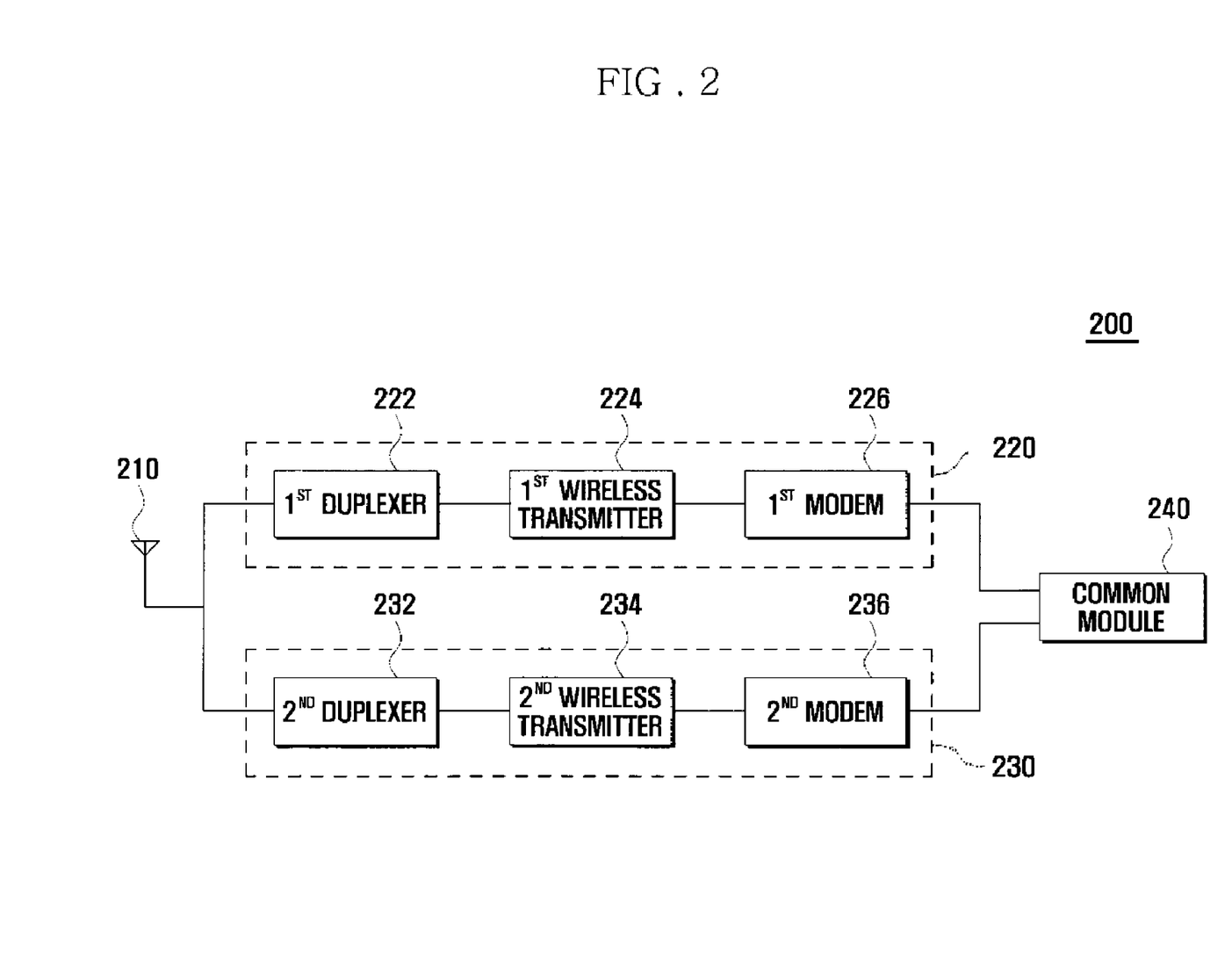
FIG. 2 is a schematic view depicting a multi-mode portable terminal according to an embodiment of the present invention.

FIG. 2 is a schematic view depicting a multi-mode portable terminal according to an embodiment of the present invention.

As shown in FIG. 2, the multi-mode portable terminal 200 includes: an antenna 210; a $1^{st}$ communication module 220 for communicating with a network of a licensed wireless system (hereinafter, referred to as a GERAN); a $2^{nd}$ communication module 230 for communicating with a network of an unlicensed wireless system (hereinafter, referred to as a UMA/GAN); and a common module 240 for controlling the entire function of the multi-mode portable terminal 200.

The antenna 210 can process a frequency band for communicating with the GERAN and a frequency band for communicating with the UMA/GAN, simultaneously. Although the embodiment of the present invention is implemented with one antenna 210 as shown in FIG. 2, it should be understood that the embodiment can be modified in such a way to include two or more antennas corresponding to the networks.

The $1^{st}$ communication module 220 includes: a $1^{st}$ duplexer 222 serving as a band pass filter (BPF) for classifying frequencies; a $1^{st}$ wireless transceiver 224 for separating a transmitted/received frequency into a predetermined frequency band; and a $1^{st}$ modem 226 for processing a wireless section protocol for the GERAN. The $1^{st}$ communication module 220 may be implemented with a licensed communication module through which a licensed wireless system provides services.

The $2^{nd}$ communication module 230 includes: a $2^{nd}$ duplexer 232 serving as a band pass filter (BPF) for classifying frequencies; a $2^{nd}$ wireless transceiver 234 for separating a transmitted/received frequency into a predetermined frequency band; and a $2^{nd}$ modem 236 for processing a wireless section protocol for the UMA/GAN. The $2^{nd}$ communication module 230 may be implemented with an unlicensed communication module through which an unlicensed wireless system provides services.

The common module 240 serves to control the $1^{st}$ and $2^{nd}$ communication modules 220 and 230 and the entire operation and function of the multi-mode portable terminal 200. The common module 240 includes: an application processor for performing a multimedia function; a memory; an input/output unit; an application processing unit; and a controller for controlling signal flows between the elements in the multi-mode portable terminal.

When the common module 240 receives a service request (an incoming call) from a network or a service request (a call connection request) from a user to be connected to the network, it measures a wireless system corresponding to the request. The common module 240 controls the communication modules ($1^{st}$ communication module 220 or $2^{nd}$ communication module 230) corresponding to the measured wireless system so that it can be connected to a corresponding wireless system.

When obtaining access to one of the GERN and the UMA/GAN networks, the common module 240 controls communication service connection of a communication module corresponding to the obtained network. As well, when obtaining both the GERN and the UMA/GAN networks simultaneously, the common module 240 controls a corresponding $1^{st}$ or $2^{nd}$ communication modules based on a previously set priority sequence, to connect the corresponding communication module to the corresponding network.

The common module 240 adaptively controls the number of neighbor cells that the portable terminal 200 manages according to the received signals strength indicators (RXLEV and WLAN_RSSI) obtained from the GERN and the UMAN/GAN, respectively. To this end, the common module 240 includes software modules referred to as software entities. For example, the software entity executed in the controller includes an entity for managing a GER radio resource, GERN-RR Entity, and an entity for managing an UMA/GAN radio resource, UMA/GAN-RR Entity.

When the portable terminal 200 is in a UMA/GAN supporting mode and the GERN-RR Entity operates in a detached cell reselection mode, the number of neighbor cells managed by the portable terminal 200 is adaptively changed and controlled according to the received signal strength indicators WLAN_RSSI and RELEV which are measured in the UMAN/GAN-RR Entity and the GERN-RR Entity, respectively. Therefore, although the portable terminal 200 moves from the UMA/GAN mode to the GERN mode, such an operation can prevent the services from interrupting and reduce processing load and battery power of the portable terminal 200, which will be detailed in more detail.

Although the method for managing cells according to an embodiment of the present invention is described in such a way that the licensed wireless system is a GERN and the unlicensed wireless system is a WLAN, it should be understood that the cells of other licensed wireless systems can also be managed through consideration of the received signal strength indicators of other licensed wireless systems and unlicensed wireless systems.

The $1^{St}$ communication module 220 and the $2^{nd}$ communication module 230 includes a $1^{st}$ communication interface (licensed communication interface) and a $2^{nd}$ communication interface (unlicensed communication interface) such that the multi-mode portable terminal 200 can communicate with a licensed wireless system and an unlicensed wireless system, respectively, under the control of the common module 240.

As such, the portable terminal 200 according to an embodiment of the present invention support two or more communication connection modes.

When the multi-mode portable terminal 200 is turned on, it can activate the $1^{st}$ communication module 220 and the $2^{nd}$ communication module 230 simultaneously. As well, the multi-mode portable terminal 200 can activate only either the $1^{st}$ or $2^{nd}$ communication modules 220 and 230 according to a user's selection or a previously set priority sequence. In that case, if one of the communication modules is activated but the portable terminal is not connected to a corresponding wireless system, another communication module is activated and tries to connect to a wireless system corresponding thereto. As such, the multi-mode portable terminal 200 of the present invention can simultaneously process services received through the licensed wireless system and unlicensed wireless system.

In addition, the multi-mode portable terminal 200 according to an embodiment of the present invention can communicate with a communication system through either the $1^{st}$ or $2^{nd}$ communication modules 220 and 230 according to a preset preferred communication system mode.

Furthermore, the multi-mode portable terminal 200 according to an embodiment of the present invention can adaptively control either the $1^{st}$ or $2^{nd}$ communication modules 220 and 230 or simultaneously control both the $1^{st}$ and $2^{nd}$ communication modules 220 and 230, according to a provided communication system. Such a mode selection can be set through a user interface menu, "Mode Selection Preference," provided by a graphic user interface (GUI) associated with the multi-mode portable terminal 200 or such that the modes can be adaptively and automatically changed according to the type of provided communication system. The mode selection is described in Table 1.

Although the multi-mode portable terminal according to an embodiment of the present invention is described based on communication systems supported thereby, such as a GERAN and a WLAN, etc., it should be understood that the multi-mode portable terminal is not restricted to the exemplary embodiment illustrated herein. The multi-mode portable terminal according to the present invention can be applied to the communication systems that currently provide commercial services, and communication systems that will be developed in the future, which can provide at least two or more communication services.

The following is a description of a method for efficiently managing neighbor cells of the multi-mode portable terminal. In particular, it should be understood that the following embodiments do not restrict the present invention and can be modified in a variety of ways.

Figure 3:
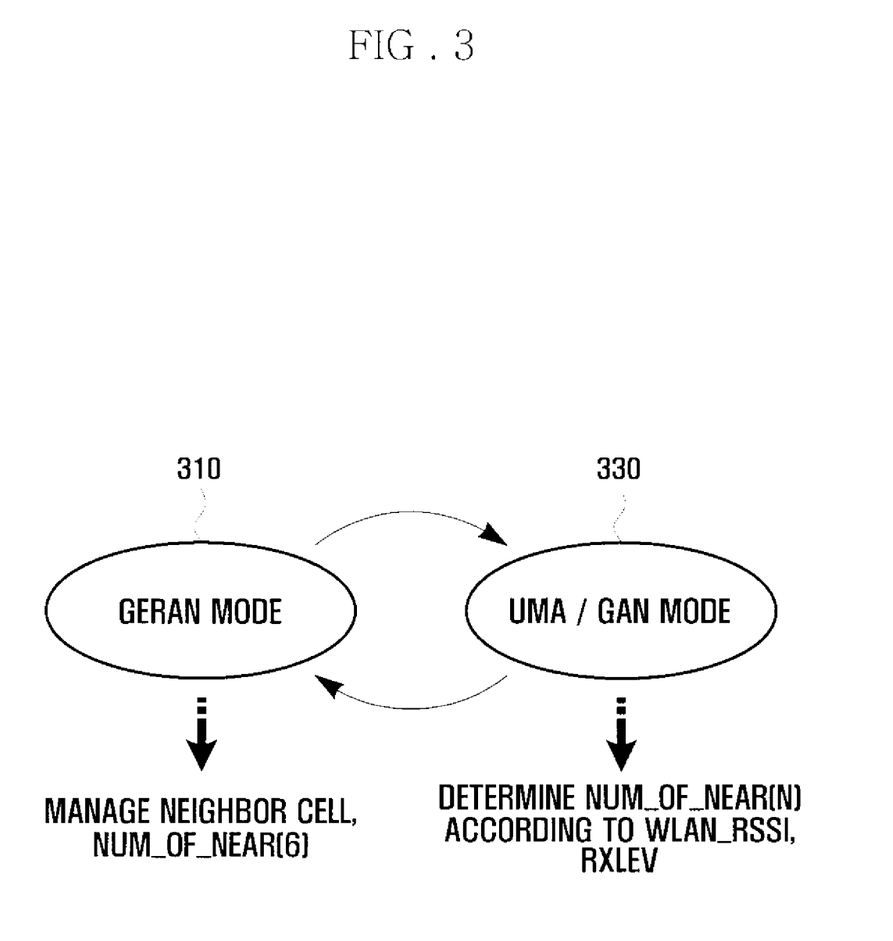
FIG. 3 is a view describing a method for managing neighbor cells based on communication modes of a multi-mode portable terminal according to an embodiment of the present invention.

FIG. 3 is a view describing a method for managing neighbor cells based on communication modes of a multi-mode portable terminal according to an embodiment of the present invention.

The WLAN_RSSI denotes a WLAN signal strength indicator of an AP that currently provides a service through the UMA/GAN-RR Entity. The RXLEV(s) denotes a signal strength indicator of a cell that provides a service through the GERAN-RR Entity. Threshold 1 (Th1) denotes a threshold for a WLAN signal of an AP that currently provides a service through the UMA/GAN-RR Entity.

Threshold 2 (Th2) denotes a threshold for a signal of a cell that provides a service through the GERAN-RR Entity. NUM_OF_NEAR(n) denotes the number of neighbor cells managed by the GERAN-RR Entity, where $0 \leq n \leq 6$. It is understood that the number of neighbor cells cannot be restricted by the range described above but can be changed depending on system design and performance of the portable terminal.

As shown in FIG. 3, while the portable terminal is operating in the GERAN mode 310, the GERAN-RR Entity manages the neighbor cells of NUM OF_NEAR (6).

If the multi-mode portable terminal changes itself from the GERAN mode 310 to the UMA/GAN mode 330, the GERAN-RR Entity determines the number of neighbor cells NUM_OF_NEAR (n) according to the received signal strength indicators WLAN_RSSI and RXLEV(s). The number of neighbor cells, n, managed by the portable terminal is determined by the following. Based on the determined number, the neighbor cells are managed.

(1) If WLAN_RSSI$\geq$Th1 and RXLEV(s)$\geq$Th2, n is determined as 0;

(2) If WLAN_RSSI$\geq$Th1 and RXLEV(s)<Th2, n is determined as 1;

(3) If WLAN_RSSI<Th1 and RXLEV(s)<Th2, n is determined as 2;

(4) If WLAN_RSSI<Th1 and RXLEV(s)$\geq$Th2, n is determined as 2; and (5) Every time n is changed, 32 neighbor cells undergo measurement of a received signal strength indicator RXLEV.

Although the number of neighbor cells, n, is implemented by specific numbers as determined above, it should be understood that the present invention is not restricted to the specific numbers, but instead the number of neighbor cells can be variously changed according to the system environment. For example, n is determined according to the received signal strength indicators WLAN_RSSI and RXLEV, such as: n=1 in item (1); n=2 in item (2); n=6 in item (3); and n=1 item (4). That is, the number of neighbor cells, n, complies with values that were determined when the system was designed. Since the portable terminal can be moved to the GERAN if WLAN_RSSI<Th1, it is preferable that the portable terminal can manage a certain number of neighbor cells according to the system setup as described in the above example, irrespective of the environment (RXLEV) of a serving GERAN cell. That is, if the received signal strength indicator WLAN_RSSI of an unlicensed wireless system is less than a preset threshold, irrespective of the received signal strength indicator RXLEV of a licensed wireless system, it is preferable that the minimum of neighbor cells is managed to prevent the service from being interrupted.

While the multi-mode portable terminal is providing services in the UMA/GAN mode, it can adaptively adjust the number of managed neighbor cells to comply with the network environment and simplify the management procedure, so that the performance of the portable terminal can be increased but the battery consumption can be reduced.

Figure 4:
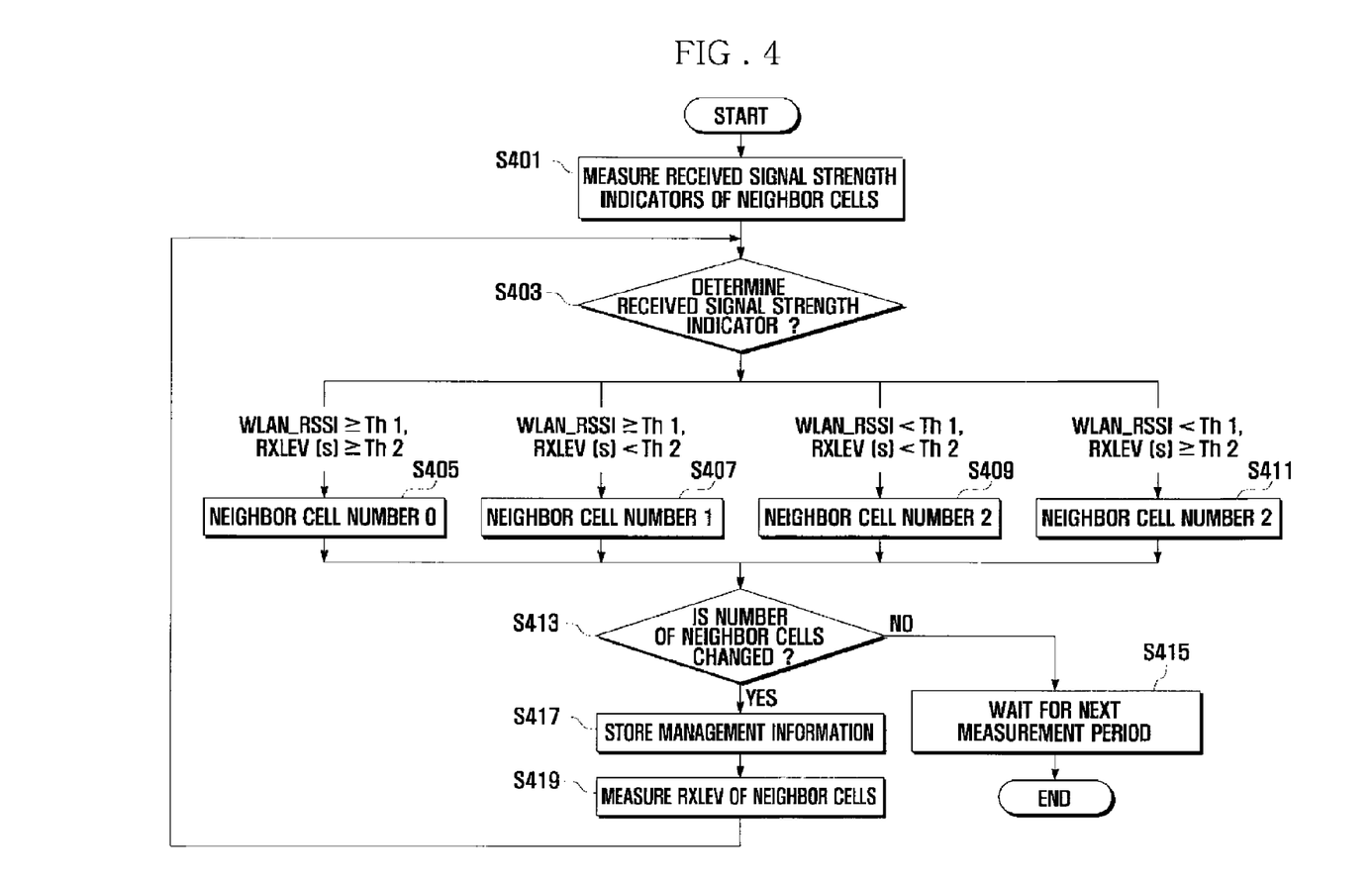
FIG. 4 is a flow chart describing a method for managing neighbor cells of a multi-mode portable terminal according to an embodiment of the present invention.

FIG. 4 is a flow chart describing a method for managing neighbor cells of a multi-mode portable terminal according to an embodiment of the present invention.

Referring to FIG. 4, the multi-mode portable terminal measures received signal strength indicators of neighbor cells (S401). That is, the portable terminal measures a received signal strength indicator of an unlicensed wireless system, WLAN_RSSI, and a received signal strength indicator of a licensed wireless system, RXLEV, in which the unlicensed and licensed wireless systems are currently providing services. After that, the portable terminal determines the measured received signal strength indicators (S403).

Here, the received signal strength indicators are determined based on preset threshold Th1 and Th2 as follows.

If the received signal strength indicator of an unlicensed wireless system, WLAN_RSSI, is equal to or greater than the $1^{st}$ threshold, Th1, and the received signal strength indicator of a licensed wireless system, RXLEV, is equal to or greater than the $2^{nd}$ threshold, Th2, the portable terminal sets the number of managed neighbor cells NUM _OF_NEAR (n) to 0 (S405). That is, the number of neighbor cells intended to be managed, n, is determined as 0. In this case, the network environment of the unlicensed and licensed wireless systems is very good. Therefore, the number of managed neighbor cells, n, can be set to the minimum of the preset values.

If the received signal strength indicator of an unlicensed wireless system, WLAN_RSSI, is equal to or greater than the $1^{st}$ threshold, Th1, and the received signal strength indicator of a licensed wireless system, RXLEV, is less than the $2^{nd}$ threshold, Th2, the portable terminal sets the number of managed neighbor cells NUM_OF_NEAR (n) to 1 (S407). That is, the number of neighbor cells intended to be managed, n, is determined as 1. In this case, the network environment of the unlicensed wireless system is very good but the network environment of the licensed wireless system is unstable. Therefore, the number of managed neighbor cells, n, can be set to a select value of the preset values.

If the received signal strength indicator of an unlicensed wireless system, WLAN_RSSI, is less than the $1^{st}$ threshold, Th1, and the received signal strength indicator of a licensed wireless system, RXLEV, is also less than the $2^{nd}$ threshold, Th2, the portable terminal sets the number of neighbor cells NUM_OF NEAR (n) to 2 (S409). That is, the number of neighbor cells intended to be managed, n, is determined as 2.

In this case, the network environments of the unlicensed and licensed wireless systems are unstable. Therefore, the number of managed neighbor cells, n, can be set to another select value of the preset values. In this case, the value of n=2 is set as a maximum value.

If the received signal strength indicator of an unlicensed wireless system, WLAN_RSSI, is less than the $1^{st}$ threshold, Th1, and the received signal strength indicator of a licensed wireless system, RXLEV, is equal to or greater than the $2^{nd}$ threshold, Th2, the portable terminal sets the number of managed neighbor cells NUM_OF_NEAR (n) to 2 (S411). That is, the number of neighbor cells intended to be managed, n, is determined as 2. In this case, the network environment of the unlicensed wireless system is unstable and the network environment of the licensed wireless system is very good. Therefore, the number of managed neighbor cells, n, can be set to the maximum of the preset values.

After the portable terminal determines the number of neighbor cells intended to be managed according to the received signal strength indicators, the number of neighbor cells is compared with a previously set value to determine whether it is changed (S413).

If the number of neighbor cells is not changed at step S413, the portable terminal waits for the next measurement period (S415).

However, if the number of neighbor cells is changed at step S413, the portable terminal changes the changed number of neighbor cells to the set up value and stores it (S417). After that, the portable terminal measures received signal strength indicators RXLEV of the neighbor cells according to the changed number of neighbor cells (S419), and then proceeds to step S403 to repeatedly perform the procedure.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

As described above, the apparatus and method according to the present invention can efficiently manages neighbor cells of the multi-mode portable terminal that supports a licensed wireless system and an unlicensed wireless system. The apparatus and method of the present invention can adaptively adjust the number of neighbor cells of the multi-mode portable terminal according to the system environment. Therefore, the apparatus and method of the present invention can simplify the processes for managing cells and accordingly enhance the performance of the multi-mode portable terminal, with reduction of the battery consumption.

Although exemplary embodiments of the present invention have been described in detail hereinabove, it should be understood that many variations and modifications of the basic inventive concept herein described, which may appear to those skilled in the art, will still fall within the sprit and scope of the exemplary embodiments of the present invention as defined in the appended claims.

What is claimed is:

1. A method for managing cells of a multi-mode portable terminal comprising:

measuring a signal strength received from at least one of a wireless unlicensed wireless system and a wireless licensed system;

determining whether the measured signal strength corresponds to an unlicensed wireless system or a licensed wireless system, said determining comprising the steps of:

comparing the measured signal strength associated with the unlicensed wireless system to a corresponding first threshold;

comparing the measured signal strength associated with the licensed wireless system to a corresponding second threshold; and changing a number of neighbor cells managed by the multi-mode portable terminal in response to the determination, said number of neighbor cells being changed in view of said measured signal strengths of the licensed and unlicensed network exceed corresponding ones of the first and second thresholds.

2. The method of claim 1, wherein changing the number of neighbor cells comprises:

determining the number of neighbor cells according to the determined received signal strength indicator; and changing a previously stored number of neighbor cells managed by the multi-mode portable terminal to the determined number of neighbor cells.

3. The method of claim 2, further comprising:

comparing the determined number of neighbor cells with the previously stored number of neighbor cells; and re-measuring a received signal strength indicator of the licensed wireless system if the number of neighbor cells is determined as being changed.

4. A method operable in a multi-mode portable terminal for managing a number of neighboring cells when said terminal is in communication with a licensed network and an unlicensed network, the method comprising:

measuring a network environment by the multi-mode portable terminal, said network environment comprising signal strengths of the licensed and unlicensed networks;

comparing signals strengths of the licensed and unlicensed networks with corresponding first and second thresholds; and adaptively changing and managing the number of neighbor cells near the licensed wireless system in response to the measured network environment, said number of neighbor cells being changed in view of said signal strengths of the licensed and unlicensed network with respect to respective ones of the first and second thresholds.

5. A method for managing cells of a multi-mode portable terminal in communication with at least one of an unlicensed network and a licensed network, said method comprising:

measuring a network environment in an unlicensed wireless system supporting mode, said measuring a network environment comprises:

comparing a received signal strength indicator of the unlicensed wireless system with a preset first threshold in a unlicensed wireless system management module; and comparing a received signal strength indicator of the licensed wireless system with a preset second threshold in a licensed wireless system management module;

adaptively adjusting a number of neighbor cells managed by the portable terminal, which are from among the neighbor cells of the unlicensed wireless system, said number of neighbor cells being changed in view of said received signal strength indicators of the licensed and unlicensed network with respect to respective ones of the first and second thresholds; and re-measuring a received signal strength indicator of the unlicensed wireless system if the number of neighbor cells is changed.

6. The method of claim 5, further comprising:
if the number of neighbor cells is changed, changing a preset number of neighbor cells to the changed number of neighbor cells.

7. The method of claim 5, furthering comprising:
if the network environment is equal to or greater than the first and second thresholds, setting the number of neighbor cells managed by the multi-mode portable terminal to a minimum value.

8. The method of claim 7, furthering comprising:
if the network environment is less than the first and second thresholds, setting the number of neighbor cells managed by the portable terminal to a maximum value.

9. A multi-mode portable terminal comprising:
a first communication module for communicating with a licensed wireless system;
second communication module for communicating with an unlicensed wireless system; and
a common module for measuring a network environment based on signals received through the first and second communication modules and controlling a number of managed neighbor cells to comply with the measured network environment, said number of managed neighbor cells being changed in view of said received signals of the licensed and unlicensed network with respect to respective ones of the first and second thresholds.

10. The terminal of claim 9, wherein the common module measures the network environment using a received signal strength indicator of a signal of the licensed wireless system, which is received by the first communication module, and a received signals strength indicator of a signal of the unlicensed wireless system, which is received by the second communication module.

11. The terminal of claim 9, wherein, if the network environment is stable, the common module sets the number of neighbor cells managed by the multi-mode portable terminal to a minimum value of a set of preset values.

12. The terminal of claim 9, wherein, wherein, if the network environment is unstable, the common module sets the number of neighbor cells managed by the multi-mode portable terminal to a maximum value of a set of preset values.

13. A dual-system portable terminal comprising:
first and second receiving systems;
a common module in communication with each of said first and second receiving systems comprising:
a processor in communication with a memory, the memory including software instruction, which when accessed by the processor causes the processor to execute the steps of:
measuring a signal strength indicator from at least one of said first and second receiving systems;
comparing the measured signal of the first system with a first threshold; and the measured signal of the second system with a second threshold; and
determining a number of managed cells based on the relationship of the measured signal strength of the first and second receiving systems with respective threshold values, and
changing the number of managed cells, wherein the number of neighbor cells is changed in view of said measured signal strengths of the licensed and unlicensed network in relation to respective ones of the first and second thresholds.

14. The terminal of claim 13 wherein if the measure signal strength of the first and second receiving systems are equal to or greater than their respective thresholds, changing the number of managed neighbor cells to a minimum value of a set of preset values.

15. The terminal of claim 13 wherein if the measure signal strength of the first and second receiving systems are less than their respective thresholds, changing the number of managed neighbor cells to a maximum value of a set of preset values.

16. The terminal of claim 13, wherein the processor further executing the steps of:
re-measuring a received signal strength of the receiving systems when the number of neighbor cells is changed.

17. The method of claim 1, wherein the number of neighbor cells is managed to prevent service interruption when the received signal strength of the unlicensed wireless system is unstable; and storing the number of neighbor cells.

18. The method of claim 4, wherein the number of neighbor cells is managed to prevent service interruption when the received signal strength of the unlicensed wireless system is unstable; and storing the number of neighbor cells.

19. The method of claim 5, wherein the number of neighbor cells is managed to prevent service interruption when the received signal strength of the unlicensed wireless system is unstable; and storing the number of neighbor cells.

20. The terminal of claim 9, wherein the number of neighbor cells is managed to prevent service interruption when the received signal strength of the unlicensed wireless system is unstable; and storing the number of neighbor cells.

21. The terminal of claim 13, wherein the number of neighbor cells is managed to prevent service interruption when the received signal strength of the unlicensed wireless system is unstable; and storing the number of neighbor cells.

* * * * *

UNITED STATES PATENT AND TRADEMARK OFFICE
CERTIFICATE OF CORRECTION

PATENT NO. : 8,265,636 B2  
APPLICATION NO. : 12/127875  
DATED : September 11, 2012  
INVENTOR(S) : Hyun Hye Lee et al.

Page 1 of 1

It is certified that error appears in the above-identified patent and that said Letters Patent is hereby corrected as shown below:

In the Claims:

Column 12, Claim 5, Line 58 should read as follows:
--...old in an unlicensed wireless...--

Column 13, Claim 12, Line 44 should read as follows:
--of Claim 9, wherein, if the...--

Signed and Sealed this
Thirtieth Day of April, 2013

Teresa Stanek Rea
*Acting Director of the United States Patent and Trademark Office*